United States Patent [19]

Lehman et al.

[11] Patent Number: 5,879,826
[45] Date of Patent: Mar. 9, 1999

[54] PROTON EXCHANGE MEMBRANE FUEL CELL

[75] Inventors: Peter A. Lehman; Charles E. Chamberlin, both of Arcata; Ronald M. Reid, McKinleyville; Thomas G. Herron, Eureka, all of Calif.

[73] Assignee: Humboldt State University Foundation

[21] Appl. No.: 669,061

[22] Filed: Jun. 24, 1996

Related U.S. Application Data

[60] Provisional application No. 60/000,798 Jul. 5, 1995.
[51] Int. Cl.[6] .................................................. H01M 8/04
[52] U.S. Cl. .............................................. 429/13; 429/34
[58] Field of Search ................................... 429/13, 34, 25

[56] References Cited

U.S. PATENT DOCUMENTS 3,770,508  11/1973  Sandler ...................................... 429/13
4,364,805  12/1982  Rogers ..................................... 429/13 X
5,470,671  11/1995  Fletcher et al. ........................ 429/34 X
5,589,285  12/1996  Cable et al. ............................... 429/13

Primary Examiner—John S. Maples
Attorney, Agent, or Firm—Limbach & Limbach L.L.P.

[57] ABSTRACT

A polymer electrolyte membrane fuel cell using hydrogen as the fuel and oxygen containing air as the oxidant. The fuel cell including a hydrogen side electrode; an air side electrode; an electrolyte positioned between the electrodes; a hydrogen diffuser/collector plate including hydrogen channels; and an air diffuser/collector plate including air channels. A method of operation of the fuel cell including introducing hydrogen into the hydrogen channels and introducing air into the air channels at a pressure of less than 5 psig and with a channel velocity of between about 0.15 and 7.0 meters/second.

12 Claims, 11 Drawing Sheets

SECTION 2A-2A
SHOWN MAGNIFIED 400%

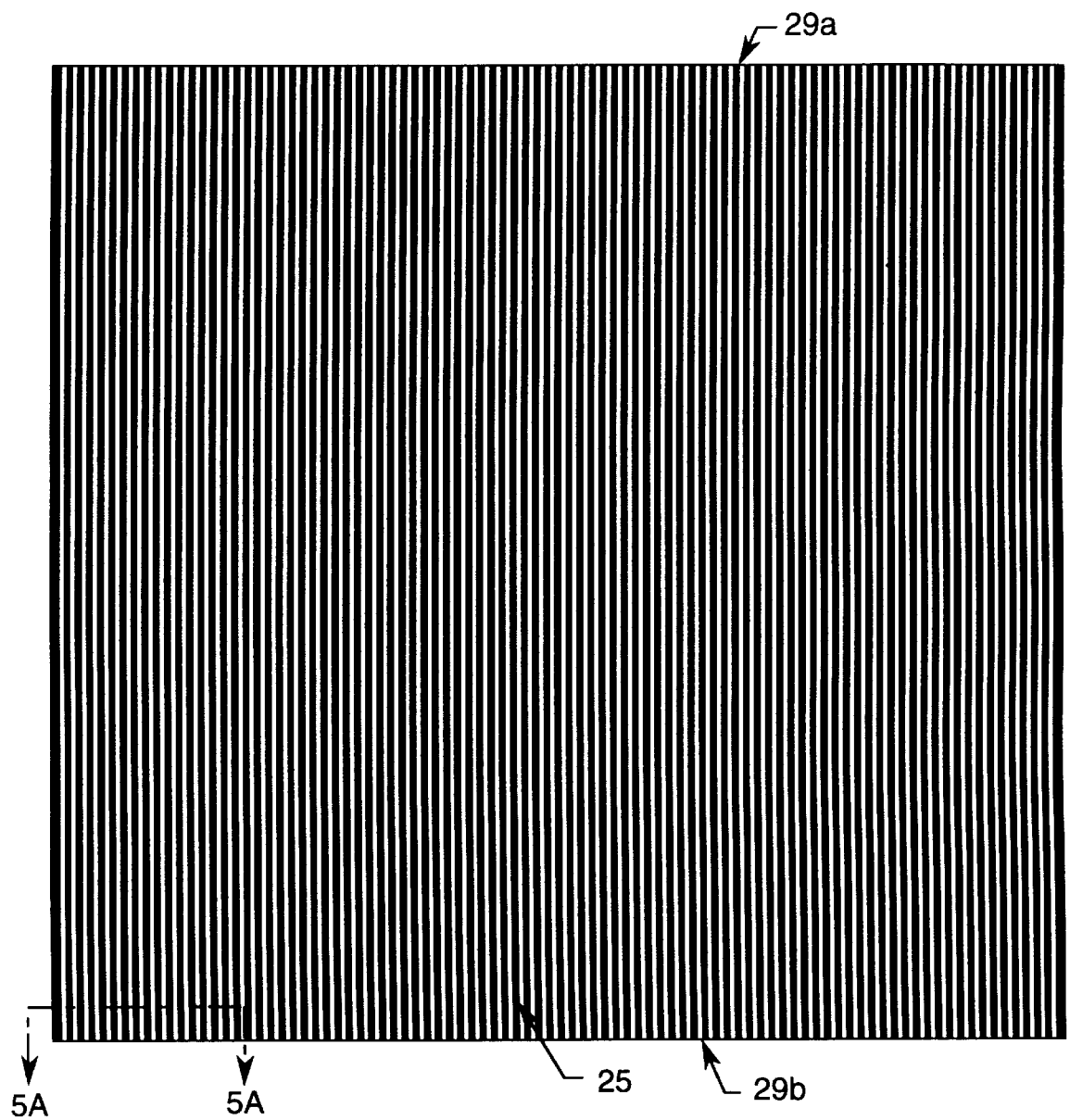
FIG. 5
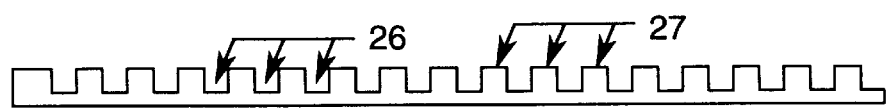
SECTION 5A-5A
SHOWN MAGNIFIED 400%   FIG. 5A

PROTON EXCHANGE MEMBRANE FUEL CELL

This application claims the benefit of U.S. Provisional application No. 60/000,798, filed Jul. 5, 1995.

BACKGROUND

The present invention relates to electrochemical fuel cells and a method of operating electrochemical fuel cells. More specifically, the present invention relates to polymer electrolyte membrane (PEM) fuel cells employing fuel and oxidant streams. More particularly, the present invention relates to PEM fuel cells utilizing hydrogen as the fuel and oxygen containing air as the oxidant.

Electrochemical fuel cells convert fuel and an oxidant to electricity and a reaction product. A typical fuel cell consists of a cathode, an anode, and an electrolyte. The electrolyte is sandwiched between the cathode and anode. Fuel, in the form of hydrogen, is supplied to the anode where a catalyst (usually platinum) catalyzes the following reaction:

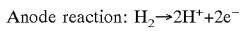

Anode reaction: $H_2 \rightarrow 2H^+ + 2e^-$

Hydrogen separates into hydrogen ions and electrons. The cations (protons) migrate through the electrolyte membrane to the cathode. The electrons migrate via an external circuit in the form of electricity.

An oxidant, in the form of oxygen or oxygen containing air, is supplied to the cathode where it reacts with the hydrogen ions that have crossed the membrane and the electrons from the external circuit to form liquid water as the reaction product. The reaction is also usually catalyzed by platinum and occurs as follows:

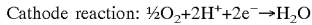

Cathode reaction: $\frac{1}{2}O_2 + 2H^+ + 2e^- \rightarrow H_2O$

Thus the fuel cell generates electricity and water through the electrochemical reaction.

Typically, the electrochemical reaction also supports a phenomenon called water pumping. As each cation (proton) migrates through the membrane, it transports or drags along several water molecules, too. Thus, there is a net transport of water to the cathode. Water pumping adds water to the product water formed at the cathode through the electrochemical reaction.

Solid polymer fuel cells generally comprise a membrane-electrode assembly (MEA). The MEA consists of a solid polymer electrolyte or ion exchange membrane situated between and in contact with two electrodes made of porous, electrically conducting sheet material. The electrodes are typically made from carbon fiber paper or cloth. At the interface of the electrode and membrane is a layer of catalyst to facilitate the electrochemical reaction. The MEA is placed between two electrically conductive plates, commonly formed from graphite. These plates have one or more reactant flow passages impressed on the surface. The reactant flow passages direct the flow of a reactant to the electrode.

The graphite flow plates, one for each electrode, provide support for the MEA and act as current collectors. Additional cells can be connected together in series to increase the voltage and power output. Such an arrangement is referred to as a fuel cell stack. In such an arrangement, the current collector plate will act as a flow plate for the anode on one side and as the flow plate for the cathode on the other. The stack will typically include inlets, outlets, and manifolds for directing the flow of the reactants as well as coolant, such as water, to the individual reactant flow plates.

To date, fuel cells have been utilized as prototypes for research or in very specialized, custom applications. In order to successfully commercialize fuel cells for vehicular propulsion, the fuel cell stack should be sized to provide sufficient power, at a useful voltage, for normal continuing operation. A significant barrier to commercialization is the power density of the fuel cell; in other words, the power produced for the volume or unit mass of the fuel cell stack. Power density needs to be higher to be practical for transportation. As a corollary, increased power density will decrease the cost to manufacture a given power rating. Thus, there is considerable interest in industry to increase fuel cell power density.

It is known that the performance of the fuel cell or fuel cell stack typically increases with increasing pressure of the reactants. As reactant pressure increases, the power density of the fuel cell increases. See for example Srinivasan, et al., "Advances in Solid Polymer Electrolyte Fuel Cell Technology with Low Platinum Loading Electrodes" (Journal of Power Sources, 22 (1988) 359–375) in which this proposition is discussed. Fuel cell systems such as those disclosed in U.S. Pat. Nos. 5,260,143, 5,252,410, 5,366,821, and 5,360,679 and 5,346,778 utilize reactant pressures ranging from 10 p.s.i.g. to approximately 65 p.s.i.g. or higher. A common emphasis in these systems is to maximize the power output of the fuel cell or fuel cell stack.

Further, papers such as "The Renaissance of the Solid Polymer Fuel Cell" (Journal of Power Sources, 29 (1990) 239–250) by K. Prater and "Solid Polymer Fuel Cell Developments at Ballard" (Journal of Power Sources, 37 (1992) 181–188) also by K. Prater, disclose reactant pressures ranging from 30 psig to 50 psig and higher for improved cell and stack performance.

Many of the above systems use (substantially) pure oxygen as the oxidant. However, when working with oxygen-containing air as the oxidant reactant, the reactant must typically be supplied in larger volumes to compensate for the reduced concentration of oxygen. The increased flow is required to maintain sufficient stoichiometric conditions to support the electrochemical reaction.

A consideration in the operation of a fuel cell stack is the power diverted to supporting apparatus. Supporting apparatus includes pumps, compressors or blowers, control systems, and other equipment. The power to operate these sub-systems represents a drain on the net available power from the fuel cell. This is commonly referred to as "parasitic losses" or "parasitic load." The parasitic load required to run the subsystems varies, directly, with the gross power output of the fuel cell stack. As the net power demand increases, the gross output of the fuel cell stack increases and the parasitic load also increases.

The parasitic load for oxidant compression, or the means for moving an oxidant through the fuel cell, for fuel cells operating with air as the oxidant can represent a significant portion of the total parasitic load. U.S. Pat. Nos. 5,366,821, 5,366,818, and 5,292,600 recognize the impact of such a drain and in these references the inventors considered minimizing the parasitic losses of the fuel cell system due to the air moving means.

Further references can be found in Swan, et al., "Proton Exchange Membrane Fuel Cell Characterization for Electric Vehicle Applications" (1994 SAE International Congress, February 28–March 3, Detroit, Mich.); Swan, et al., "The Proton Exchange Membrane Fuel Cell—A Strong Candidate as a Power Source for Electric Vehicles" (Technical Proceedings—Project Hydrogen '91, American Academy of Science, Independence, Mo.); and Amphlett, et al., "Operating Characteristics of a Solid Polymer Fuel Cell" (Technical Proceedings—Project Hydrogen '91, American Academy of Science, Independence, Mo.). The authors demonstrate that compressor power requirements can constitute a major parasitic load that is not offset by improved net efficiency.

FIG. 1 shows the minimum voltage loss and the fractional net power loss due to adiabatic compression under ideal conditions. Fuel cells operate under real world conditions, not "ideal" conditions. Ergo, the actual losses will be higher.

Therefore, with respect to fuel cell design, a paradoxical problem exists; namely, fuel cell performance increases with increasing reactant pressure while parasitic losses similarly increase which serves to negate or even reduce net power gains.

Another consideration in fuel cell stack performance concerns water management. The accumulation of water at the cathode, due to water pumping and from product water, creates problems for the operation of the fuel cell. The presence of water in the vicinity of the catalyst layer reduces the accessibility of the catalyst to the reactant, a phenomenon commonly referred to as "flooding." Also, the presence of water, often in the form of droplets, can substantially block the flow of oxidant reactant through the oxidant passages. "Dead spots" can form in the areas where channel passages are blocked. These issues can result in a reduction of power of the fuel cell.

U.S. Pat. Nos. 5,292,600, 5,108,849, 4,855,193, and 4,729,932, recognize the need to maintain adequate oxidant flow in cathode flow passages to adequately remove water from the cell. The flow of the oxidant stream clears the water in the passages. An adequate flow of oxidant is necessary to keep all flow passages clear and to eliminate any potential dead spots that could reduce the power of the system. Maintaining adequate oxidant flow typically increases the required parasitic power. Thus, an issue with water management is the increase in parasitic losses to provide sufficient oxidant flow through the channels.

Another consideration in fuel cell stack performance that results from the oxidant air flow is that of pressure drop. Air or oxidant flowing through the reactant flow passages results in a pressure drop from the reactant inlet to the reactant outlet. The pressure drop is induced by the need to maintain adequate reactant flow for the previously mentioned water management. U.S. Pat. Nos. 5,108,849 and 4,988,583 recognize that pressure drop from reactant inlet to reactant outlet across a cell becomes significant, particularly in larger size fuel cells utilizing air as a reactant or in fuel cell stacks. Increased pressure drop across the cell requires increased inlet pressure for the oxidant and, thus, increased parasitic power.

It is an object of the present invention to provide a fuel cell that maximizes the net power from the fuel cell system. It is a further object of the present invention to reduce the overall pressure of the fuel cell system to minimize parasitic losses while still maintaining adequate airflow through the flow channels to remove water. It is also an object of the present invention to minimize the pressure drop across a fuel cell and through the fuel cell stack to reduce the parasitic losses.

SUMMARY OF INVENTION

The present invention meets the above needs by providing a PEM fuel cell stack and a method of operating a PEM fuel cell.

In one embodiment of the invention there is provided a method of operating a PEM fuel cell. In this embodiment, the PEM fuel cell includes a hydrogen side electrode, an air side electrode, an electrolyte positioned between and in electrical contact with the electrodes, an air diffuser/current collector plate positioned adjacent the air side electrode, a hydrogen side diffuser/current collector plate positioned adjacent the hydrogen side electrode. Each of the plates includes gas diffusing channels for carrying a gas across the plates so as to expose the gas to one of the electrodes. The method includes the following steps: introducing hydrogen gas into hydrogen gas carrying channels on the hydrogen side diffuser/current collector plate; passing the hydrogen gas through the channels to expose the hydrogen gas to the hydrogen side electrode; introducing air at a pressure of less than 5 psig into an air inlet to air carrying channels on the air side diffuser/current collector plate, through the channels at a channel air velocity of from about 0.15 to about 7.0 meters/second, and out of the channels through an air outlet from the channels; and maintaining the pressure drop between the air inlet and the air outlet at less than about 5 psi. A preferred pressure drop is less than about 3 psi, and a most preferred pressure drop is between about 0.1 psi and about 1.9 psi. The air may optionally be humidified prior to being introduced into the air inlet.

In another embodiment of the invention, there is provided a fuel cell stack which includes a plurality of PEM fuel cells, each of which includes the following: a hydrogen side electrode; an air side electrode; an electrolyte positioned between and in electrical contact with the electrodes; an air diffuser/current collector plate positioned adjacent to the air side electrode; a hydrogen side diffuser/current collector plate positioned adjacent the hydrogen side electrode; hydrogen gas diffusing means on a face of the hydrogen diffuser/current collector plate for providing hydrogen gas to the hydrogen side electrode; and air channel means on a face of said air diffuser/current collector plate for carrying air to said air side electrode. The hydrogen gas diffusing means includes the following: a hydrogen gas inlet manifold; no hydrogen gas outlet; and, when the face of the hydrogen diffuser/collector plate is placed in contact with the hydrogen side electrode, a series of parallel hydrogen gas carrying channels from the inlet, the hydrogen gas carrying channels being formed in an arrangement which permits water and other impurities collected therein to drain, under the force of gravity to an outlet when the cell is operating. The parallel hydrogen gas carrying channels may be substantially vertical when the cell is operating. The air channel means includes the following: one or more air channel inlet manifolds; an air channel outlet manifold; and, when the face of the air diffuser/collector plate is placed in contact with the air side electrode, an air carrying flow channel between the inlet and the outlet manifolds. The flow channel includes a first set of parallel channels connecting, in a first straight line, the inlet manifold with a first direction reversing manifold, a second set of parallel channels connecting, in a straight line parallel with the first straight line, the first direction reversing manifold with a second direction reversing manifold, and a third set of parallel channels connecting, in a third straight line parallel with each of the first and second straight lines, the second direction reversing manifold with the outlet manifold.

BRIEF DESCRIPTION OF THE DRAWINGS

FIG. 5 shows one embodiment of a hydrogen diffuser/collector plate for use in a fuel cell stack according to the present invention.

DETAILED DESCRIPTION

A proton exchange membrane (PEM) fuel cell is an electrochemical engine which utilizes hydrogen as a fuel and oxygen as the oxidant. The present invention is a PEM fuel cell system which is simpler and has greater net efficiency than has been possible heretofore. The cell of the present invention provides the following features:

active air supply at very low inlet pressure (preferably <1.9 psig)
"dead-ended" operation on the hydrogen supply
low temperature operation ($\approx 50°$ C.)

These changes in the usual operating conditions of a PEM fuel cell do not necessarily, in of themselves, produce performance improvement. However, when integrated according to the invention, these features enhance overall system performance.

Air Supply

The PEM fuel cell of the invention is air breathing; oxygen is supplied by supplying air to the cathode side of the fuel cell. Because oxygen is only 21% of the air supplied and is therefore diluted, it is desirable to supply an excess, typically 200–300% of the stoichiometric amount.

Most PEM fuel cells run at elevated pressures; air and hydrogen supply pressures are typically around 30 psig and can be as high as 75 psig. This has several advantages:

1) the partial pressure of the oxygen is increased at the cathode enhancing cell voltage at a given current,
2) humidification of the incoming air is easier at higher pressures since volumetric flow rates are reduced and less water is needed for saturation (per mole of air),
3) flow field design of the current collectors is less restrictive since larger pressure drops can be tolerated, and
4) hydrogen purges are more effective since the pressure difference between the fuel cell and atmospheric pressure is greater. This produces a greater velocity of hydrogen flow which is more effective at removing water.

Figure 1:
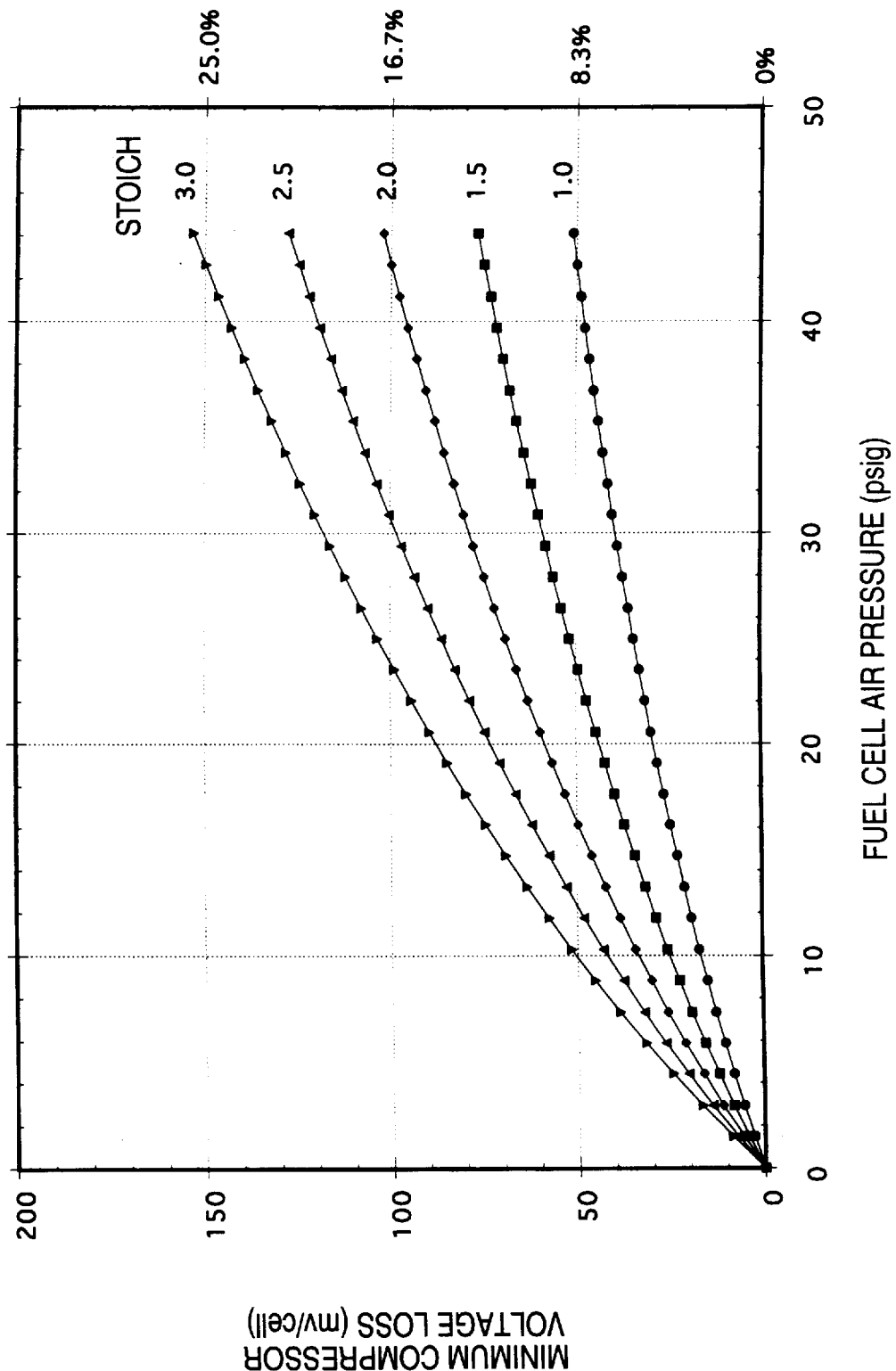
FIG. 1 shows a graph (adapted from Swan et al, The Proton Exchange Membrane Fuel Cell—A Strong Candidate as a Power Source for Electric Vehicles) of the reduction in net power as a function of air inlet pressure.

However, there is a major disadvantage. Supplying air to the fuel cell at elevated pressures requires an air compressor and consequently, considerable power consumption to drive it. This power consumption is parasitic and thus reduces the net power output and the net efficiency of the fuel cell. This parasitic loss can be equated to an equivalent voltage loss per cell in the fuel cell stack and FIG. 1 shows the voltage loss per cell as a function of air inlet pressure for different stoichiometries. FIG. 1 shows that at a stoichiometry of 300% and an inlet pressure of 30 psig, the minimum voltage loss (based on ideal, adiabatic conditions) is 120 millivolts. This represents a power loss of approximately 20% at maximum power. The actual loss will be higher since air compression is far from ideal.

There is an additional disadvantage to requiring a compressor when considering small (0.5–10.0 kW) fuel cell power systems. (Systems of this size would be used in stand-alone remote power systems and neighborhood electric vehicles.) Compressors of this size are not generally available commercially and if they were, would not be particularly efficient.

We have discovered that an improvement in net power and efficiency can be obtained by running the fuel cell at very low air inlet pressure, i.e., less than 5 psig and preferably at less than 1.9 psig. These conditions mean that stack performance is lower than at higher pressures but a simple blower is sufficient to supply the air. This cuts the parasitic power requirement considerably—enough so that net power is increased even though stack performance is reduced compared to high pressure operation. Further, a blower required for the small fuel cell power systems described above is an off-the-shelf, inexpensive item.

An alternative oxidant delivery method is to use no forced air delivery system at all but to rely instead on convective air flow to supply oxidant to the cathode. Some known stacks do this, but they are very limited in power density and their overall performance is significantly compromised compared to the design of the present invention.

Also, some known stacks rely on whisper fans or muffin fans to provide forced air delivery. These systems operate at a pressure of less than 0.1" w.c. and are also very limited in power density. Their overall performance is significantly compromised compared to the design of the present invention.

Hydrogen Supply

Another improvement in fuel cell design concerns the system which delivers hydrogen to the anode of the PEM fuel cell.

The fuel cells of the present invention include a "dead-ended" hydrogen delivery system. This requires less equipment since a separate humidification section and a separate hydrogen recirculation system are not required. We have found the fuel cell performs as well dead-ended as it does with hydrogen recirculation.

Prior art recognizes problems with dead-ended hydrogen supply such as impurity build-up and water accumulation at the anode. Typically, these issues are addressed by a brief purge conducted at regular intervals. This invention utilizes a purge—the hydrogen line is temporarily vented through a throttled opening. This removes any accumulated impurities and water and restores performance.

Operating Temperature

The fuel cell of the invention is typically operated at around 50° C., lower than operating temperatures of about 70°–80° C. for many other systems. This has several advantages:

1) Humidification of the inlet air is facilitated. The vapor pressure of water varies exponentially with absolute temperature so, for example, approximately four times less water vapor must be added at 50° C. than at 80° C. to produce saturated incoming air. This means the humidification section can be smaller and weigh less.
2) Warm-up time is reduced. If the fuel cell must heat from, for example, 20° C. to its operating temperature, warm-up time to 50° C. will be less than half of warm-up time to 80° C. This is especially important in vehicles where users will expect good performance without having to wait a significant time for the fuel cell to warm up.
3) Thermal mechanical stresses are reduced. Seals, pipe connections, and compressive forces on electrodes and current collectors are all adversely affected by stresses caused by thermal expansion and contraction of materials. Since the temperature change in this stack is smaller, these stresses are reduced.
4) Aging of components is slowed. Aging processes (such as corrosion and oxidation) are generally accelerated by elevated temperatures. Operating at lower temperatures will tend to retard them and produce a longer lived fuel cell stack.

Air Diffuser/Collector Plates

The air diffuser/collector plates in the stack must serve the following purposes:
1) provide a uniform and effective supply of air to the electrode surface at very low pressure and with low pressure drop,
2) provide a uniform and effective electrical contact with the electrode and a low resistance to current flow through the stack,
3) allow air to circulate through the plate channels without appreciable pressure drop, and
4) prevent the accumulation of liquid product water in the plate channels, a situation which would occlude flow and render a portion of the active area inoperable.

To simultaneously satisfy the above performance goals, the design of the invention includes air diffuser/collector plates with massively parallel flow paths across the cell that interact with inlet and outlet manifolds.

In one embodiment of the present invention, the air diffuser/collector plates incorporate a set of parallel flow channels that interact with an air direction reversing manifold that directs the flow of air to a second set of parallel flow channels. Two or more sets of air direction reversing manifolds are incorporated into the air diffuser/collector plate. The purpose of the air direction reversing manifold is to maintain the pressure drop across the cell to be as small as possible.

We have found that a consideration in the design of the direction reversing manifolds of the air diffuser/collector plates is maintaining an optimum range of air channel velocities through the air flow channels. Maintaining the optimum range of air channel velocities dictates the number of air direction reversing manifolds and the number of air flow channels. This criterion enables scaling of the active cross-sectional area for different sizes of fuel cell stack configurations.

The parallel flow channels and air direction reversing manifolds, as noted above, create a range of air channel velocities that enable oxygen to be supplied uniformly and at an adequate rate to the electrode on the cathode side of the cell. Also, these air channel velocities provide sufficient air flow to effectively remove product water from the cathode, thus eliminating flooding.

Air Frames

In one embodiment of the present invention, the air diffuser/collector plates use a frame and plate approach. This embodiment utilizes plastic frames to provide manifolds for delivery of air, hydrogen, and cooling water. The air diffuser/collector plates noted above fit within the central, open section of the air frame.

The air frames incorporate flat, oval shaped air passages. These passages form an air manifold with a large cross sectional area so that there is negligible pressure drop in the manifold. The frames also incorporate a grooved section that directs the flow of air to the air diffuser/collector plate.

Hydrogen Diffuser/Collector Plates

The hydrogen diffuser/collector plates in the stack must serve the following purposes:
1) provide a uniform and effective supply of hydrogen to the electrode surface at very low pressure and with low pressure drop,
2) provide a uniform and effective electrical contact with the electrode and a low resistance to current flow through the stack,
3) allow hydrogen to circulate throughout the electrode area in a dead-ended operating mode, and
4) allow water and impurities which may collect in the plate channels at the anode to be carried away by the hydrogen purge.

To simultaneously satisfy the above performance goals, the design of the invention includes hydrogen diffuser/collector plates with completely parallel flow passages across the cell which interact with inlet and outlet manifolds.

Hydrogen Frames

In one embodiment of the present invention, the hydrogen diffuser/collector plates use a frame and plate approach. This embodiment utilizes plastic frames to provide manifolds for delivery of hydrogen, air, and cooling water. The hydrogen diffuser/collector plates noted above fit within the central, open section of the hydrogen frame.

The hydrogen frames incorporate flat, oval shaped hydrogen passages. These passages form a hydrogen manifold with a large cross sectional area so that there is negligible pressure drop in the manifold. The frames also incorporate a vertically grooved section that directs the flow of hydrogen to the hydrogen diffuser/collector plate. These flow passages are oriented vertically to provide for a gravity assist in water and impurity removal.

Humidification Section

The purpose of the humidification section is to humidify (to or almost to saturation) the incoming air. Without humidification, the proton exchange membrane tends to dry out. This causes its protonic conductivity to decrease markedly and fuel cell performance to deteriorate. In a preferred embodiment of the present invention the pressure drop across the air humidification plates is small. Since air paths through the humidification section and the stack are in series, their pressure drops sum in contribution to the total pressure required for the air supply.

In one embodiment of the invention, the hydrogen supply is not humidified. Therefore the humidification section only interacts with the air supply.

In one embodiment of the present invention, the air humidification plates use completely parallel flow channels with wide cross sections to reduce the pressure drop. Also, the air manifold is enlarged in the humidification section to reduce pressure drop.

The humidification section may be located immediately adjacent to and integral with the fuel cell stack.

Figure 2:
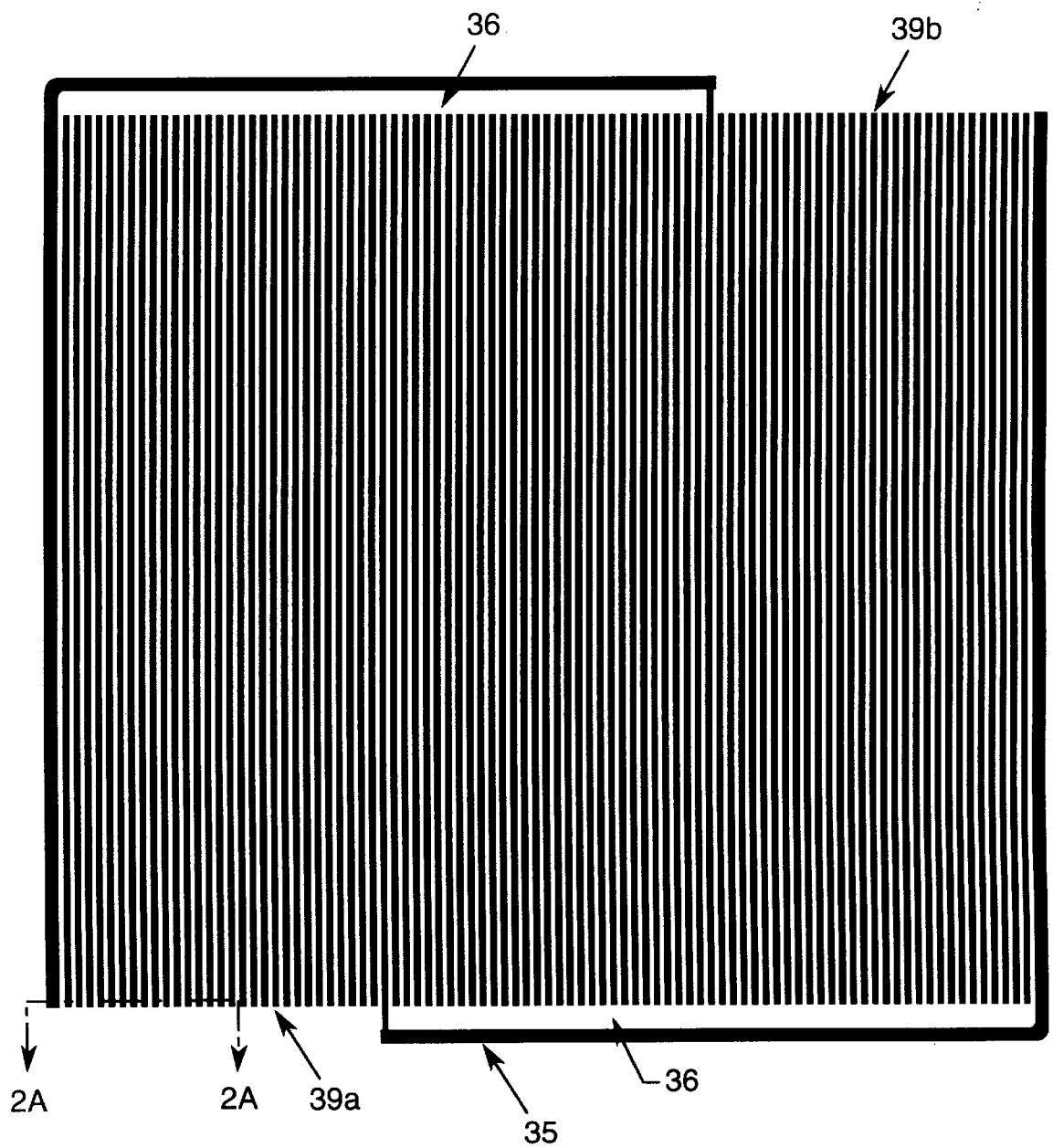
FIG. 2 shows one embodiment of an air diffuser/collector plate for use in a fuel cell stack according to the present invention.
Figure 2A:
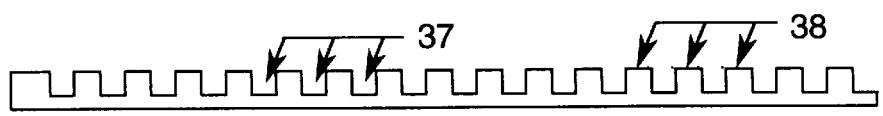

The air diffuser/collector plate 35 is illustrated in FIG. 2. Oxygen containing air enters the air diffuser/collector plate through inlet 39a through a first set of parallel air flow channels 37 that communicate with air direction reversing manifold 36. The air then moves through a second set of parallel air flow channels to a second air direction reversing manifold. After moving through a third set of parallel air flow channels, the air exits the air diffuser/collector plate through exit 39b.

The flow of oxygen containing air through the flow channels exposes the oxygen to the cathode for the electrochemical fuel cell reaction.

The air flow channels are separated by current collecting lands 38, which contact the electrode and collect the electron current. In a preferred embodiment, the air flow channels have a depth-to-width aspect ratio of 1:1 and a width of 0.040". In the preferred embodiment, the air diffuser/collector plate is designed with a 50/50 split between air channels and the current collecting lands. In the design of the present invention, the air diffuser/collector plates are fabricated from graphite.

The air diffuser/collector plate of FIG. 2 illustrates two air direction reversing manifolds. Two or more air direction reversing manifolds 36, along with parallel air flow channels, may be incorporated into an air diffuser/collector plate. As noted previously, one design consideration is the number of direction reversing manifolds of the air diffuser/collector plate. The number of air direction reversing manifolds and the number of air flow channels entering and exiting each manifold are design parameters used to maintain the optimum range of air channel velocities for fuel cell stacks with different sizes of active areas.

The air direction reversing manifolds of the present invention are not only suitable for maintaining proper air channel velocities, but are also suitable for maintaining very low pressure drop across the cell from the air inlet manifold to the air outlet manifold. The air direction reversing manifolds are designed with large, flat air passages and a large cross sectional area. This results in a negligible pressure drop in the manifold, even at maximum air flow. The overall low pressure drop and low pressure operation of the present invention results in improved net power operation of the fuel cell.

The air diffusion/collector plates of the present invention may include any number of sets of air flow channels and direction reversing manifolds as long as they are suitable for maintaining the air channel velocities and pressure drops of the present invention. For example, one embodiment of the invention has been made that includes air diffusion/collector plates with nine sets of air flow channels and eight direction reversing manifolds.

Figure 3:
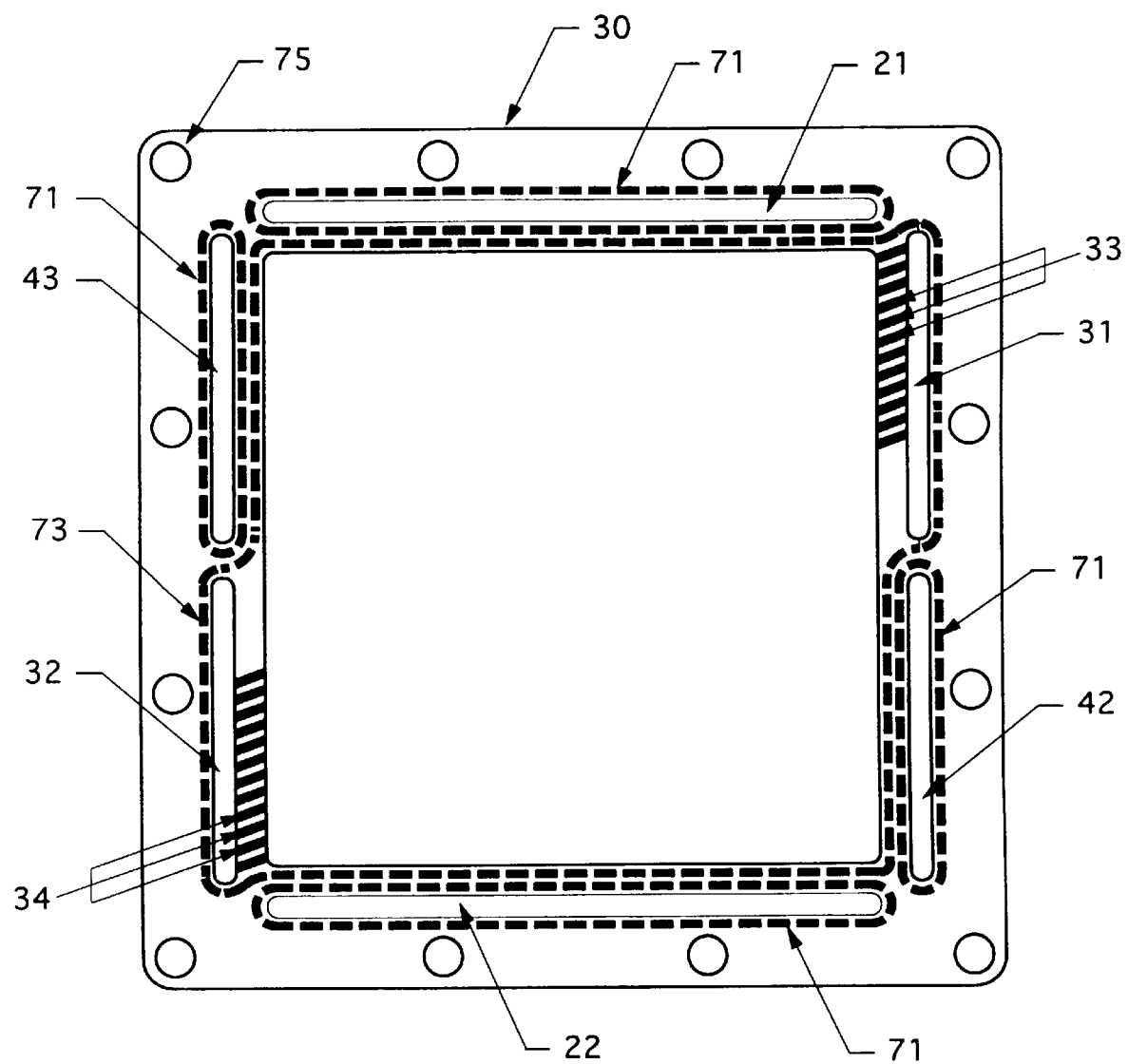
FIG. 3 shows one embodiment of an air frame for use in a fuel cell stack according to the present invention.

FIG. 3 illustrates the air frame 30. One embodiment of the present invention utilizes plastic frames to provide manifolds for delivery of air, hydrogen, and cooling water. The air inlet manifold 31 communicates with air collector inlet passages 33 and the air collector outlet passages 34 communicate with the air outlet manifold 32. The air flow area including inlet and outlet manifolds is sealed with air frame O-ring 73. The other elements of the air frame include a hydrogen inlet manifold 21, a hydrogen outlet manifold 22, a coolant inlet manifold 42, and a coolant outlet manifold 43. Manifold O-rings 71 are used to provide sealing. Tie-bolts hold the fuel cell stack assembly together through tie-bolt holes 75.

The air manifolds are designed with large, flat, oval shaped air passages. These passages form an air manifold with a large cross sectional area so that there is negligible pressure drop in the manifold, even at maximum air flow. The flat, oval shaped manifolds for the air, hydrogen, and cooling water result in minimalist frames that are lightweight and occupy a small volume. The frames are made from plastic stock. Most PEM fuel cells use a single piece of relatively expensive and dense graphite for the diffuser/collector plates and manifolds. The design of the present invention uses polypropylene which is easily fabricated, much less expensive, and lighter.

Figure 4:
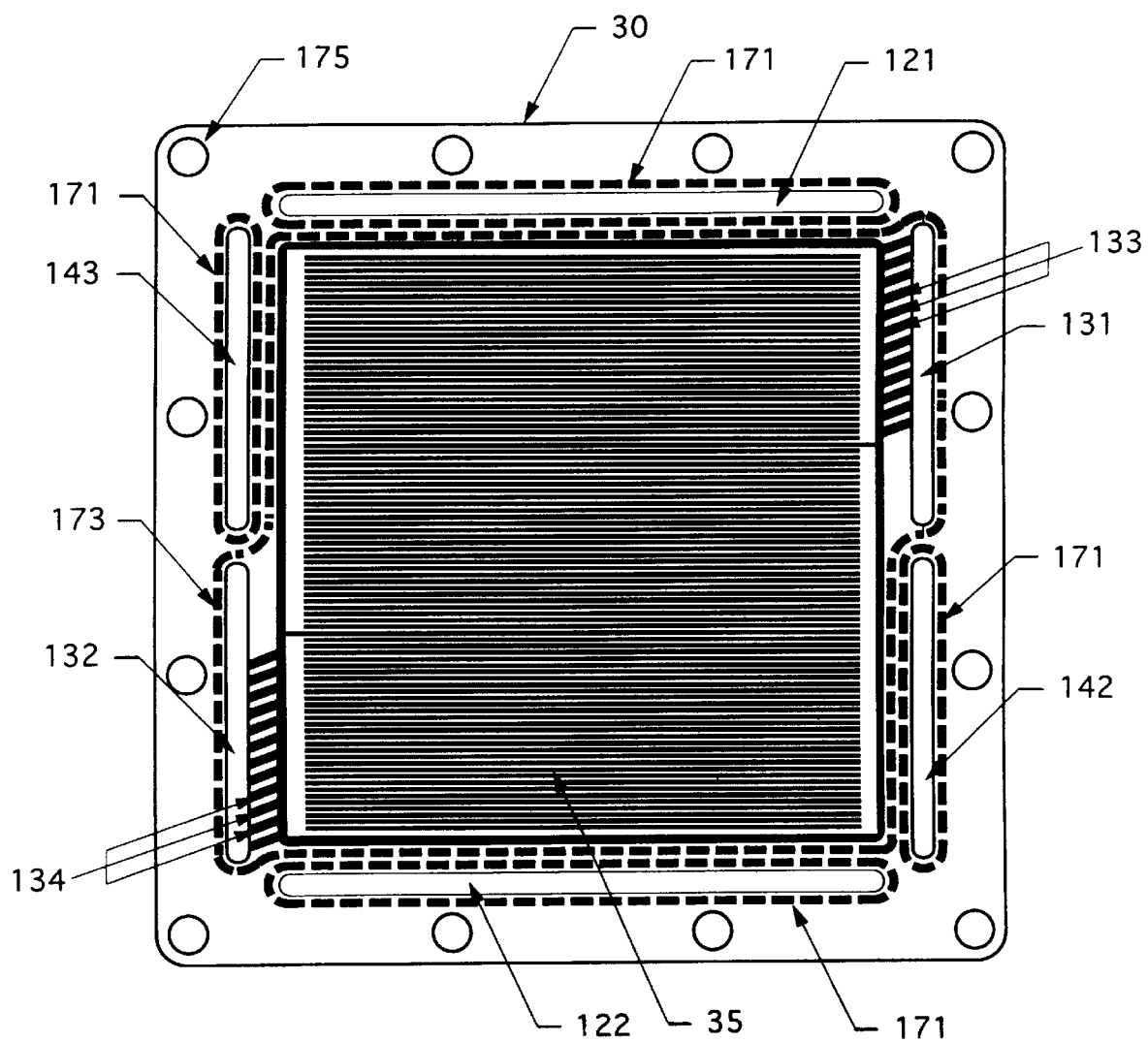
FIG. 4 shows the air diffuser/collector plate of FIG. 2 and air frame of FIG. 3 partially assembled.

The air diffuser/collector plate shown in FIG. 2 is (finger) press fit into the air frame shown in FIG. 3 to make the partial assembly as shown in FIG. 4.

In FIG. 4 the partially assembled air frame 30 is illustrated with the air diffuser/collector plate 35. Oxygen containing air enters the assembly from the air inlet manifold 131 through air collector inlet passages 133 to the air diffuser/collector plate 35 previously described in FIG. 2. Oxygen containing air moves across the air diffuser/collector plate through a first set of air flow channels to a direction reversing manifold. The air then moves through a second set of parallel air flow channels to a second air direction reversing manifold and then to a third set of parallel air flow channels. After moving through a third set of parallel flow channels, the air exits the air diffuser/collector plate through air collector outlet passages 134 to the air outlet manifold 132. The air flow area including inlet and outlet manifolds is sealed with air frame O-ring 173.

In FIG. 5 the hydrogen diffuser/collector plate 25 is illustrated. Hydrogen enters the hydrogen diffuser/collector plate through inlet 29a through a set of parallel air flow channels 26. Hydrogen exits the hydrogen diffuser/collector plate through exit 29b.

The flow of hydrogen through the flow channels exposes the hydrogen to the anode for the electrochemical fuel cell reaction.

The hydrogen flow channels are separated by current collecting lands 27, which contact the electrode and collect the electron current. In a preferred embodiment, the hydrogen flow channels have a depth-to-width aspect ratio of 1:1 and a width of 0.040". In the preferred embodiment, the hydrogen diffuser/collector plate is designed with a 50/50 split between hydrogen channels and the current collecting lands. In one embodiment of the present invention, the hydrogen diffuser/collector plates are fabricated from graphite.

The hydrogen diffuser/collector plate may utilize completely parallel flow passages that are oriented vertically. This arrangement serves to provide for facile distribution of hydrogen across the entire electrode and allows for a gravitational assist in removing water and impurities. The hydrogen flow is from top to bottom to take advantage of this assist.

Figure 6:
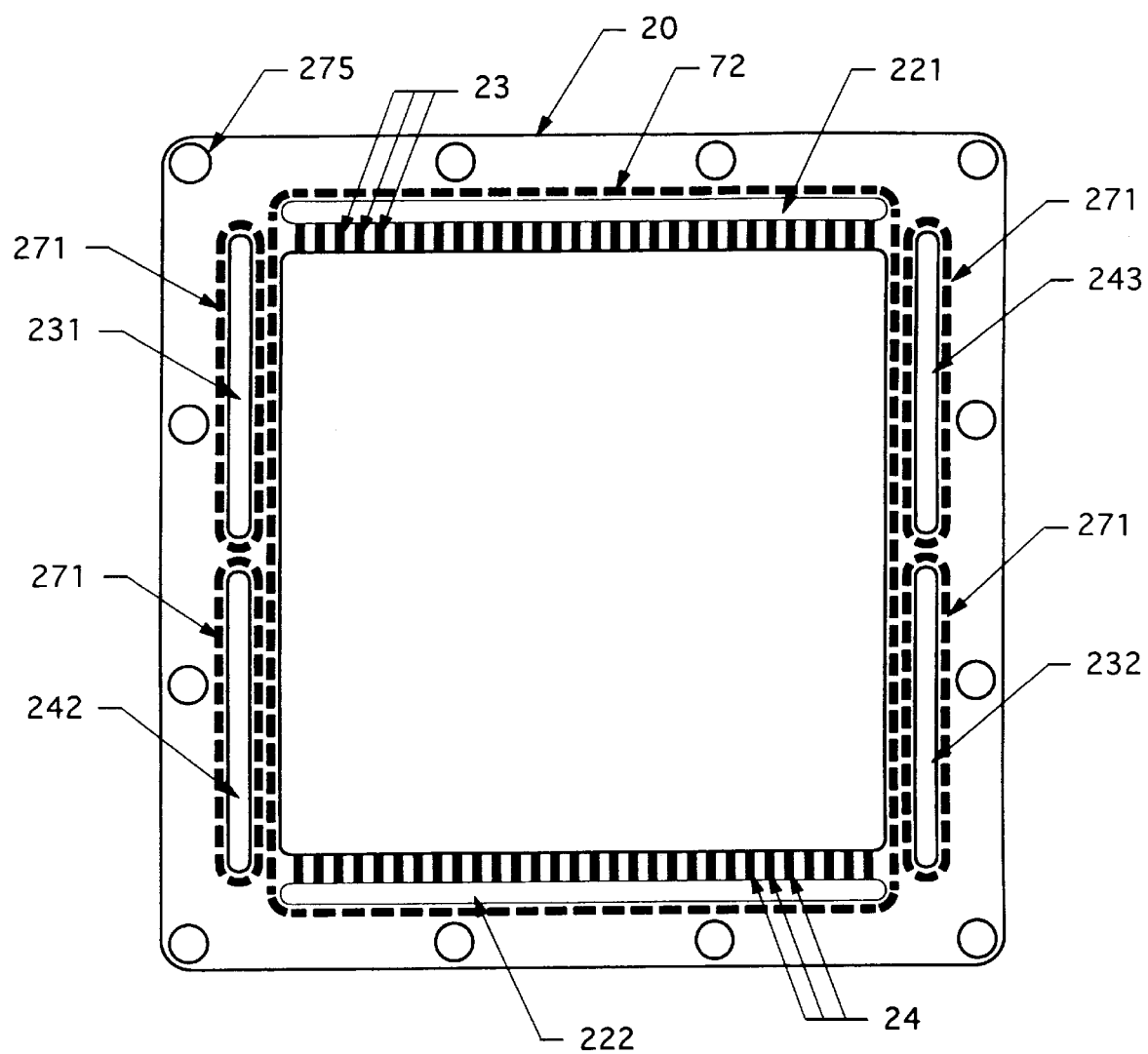
FIG. 6 shows one embodiment of a hydrogen frame for use in a fuel cell stack according to the present invention.

FIG. 6 illustrates the hydrogen frame 20. One embodiment of the present invention utilizes plastic frames to provide manifolds for delivery of air, hydrogen, and cooling water. The hydrogen inlet manifold 221 communicates with hydrogen collector inlet passages 23 and the hydrogen collector outlet passages 24 communicate with the hydrogen outlet manifold 222. The hydrogen flow area including inlet and outlet manifolds is sealed with hydrogen frame O-ring 272. The other elements of the hydrogen frame include an air inlet manifold 231, an air outlet manifold 232, a coolant inlet manifold 242, and a coolant outlet manifold 243. Manifold O-rings 271 are used to provide sealing. Tie-bolts hold the fuel cell stack assembly together through tie-bolt holes 275.

The hydrogen manifolds are designed with large, flat, oval shaped hydrogen passages. These passages form an hydrogen manifold with a large cross sectional area so that there is negligible pressure drop in the manifold, even at maximum air flow. The flat, oval shaped manifolds for the air, hydrogen, and cooling water result in minimalist frames that are lightweight and occupy a small volume. The frames are made from plastic stock. Most PEM fuel cells use a single piece of relatively expensive and dense graphite for the diffuser/collector plates and manifolds. One design of the present invention uses polypropylene which is easily fabricated, much less expensive, and lighter.

Figure 7:
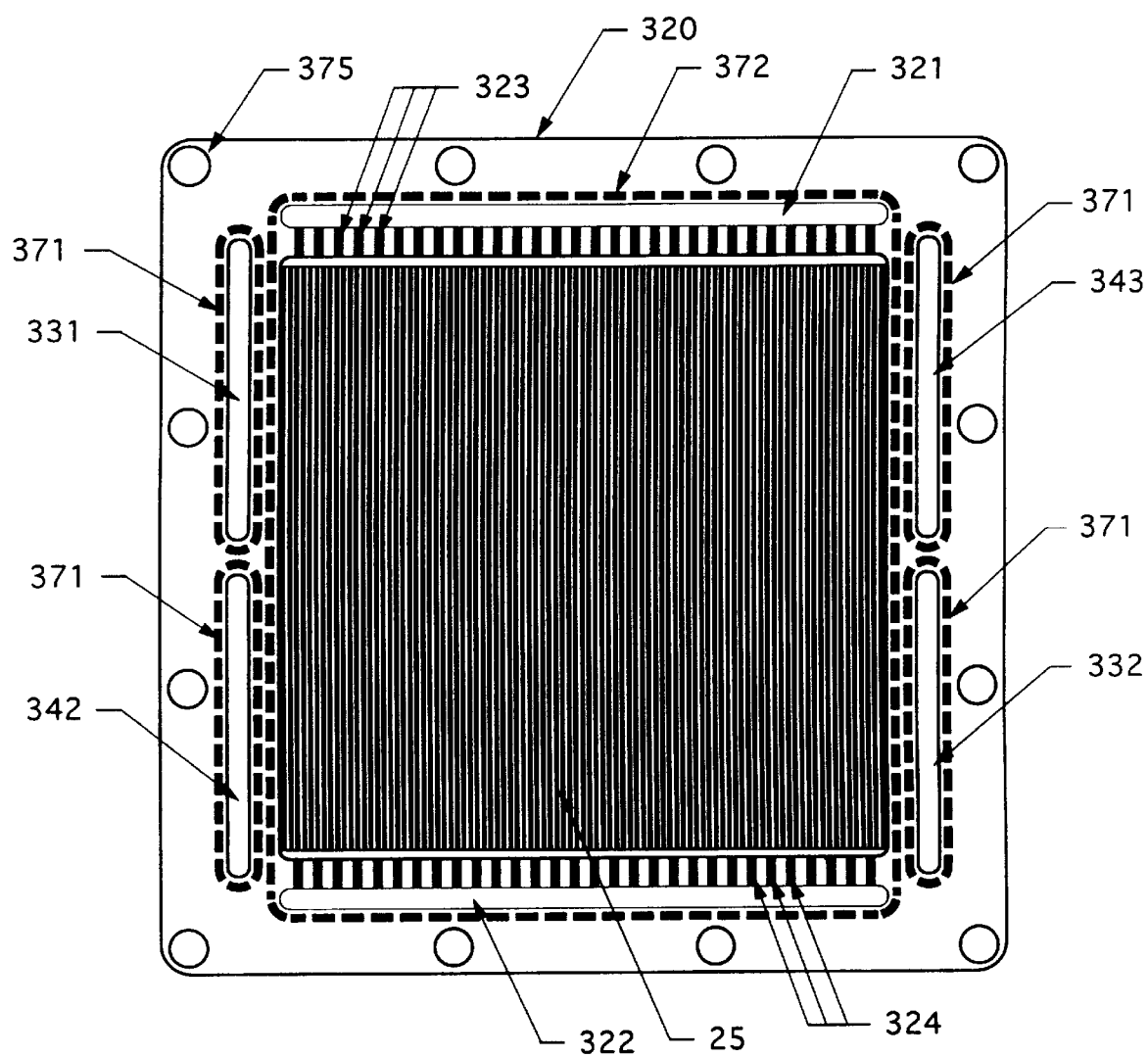
FIG. 7 shows the hydrogen diffuser/collector plate of FIG. 5 and hydrogen frame of FIG. 6 partially assembled.

The hydrogen diffuser/collector plate shown in FIG. 5 is (finger) press fit into the hydrogen frame shown in FIG. 6 to make the partial assembly as shown in FIG. 7.

In FIG. 7, the partially assembled hydrogen frame 20 is illustrated with the hydrogen diffuser/collector plate 25. Hydrogen enters the assembly from the hydrogen inlet manifold 321 through hydrogen collector inlet passages 323 to the hydrogen diffuser/collector plate 25 previously described in FIG. 5. Hydrogen flows downward through the parallel channels of the hydrogen diffuser/collector plate and exits through hydrogen collector outlet passages 324 to the hydrogen outlet manifold 322. The hydrogen flow area including inlet and outlet manifolds is seated with hydrogen frame O-ring 372.

The graphite plates used for the hydrogen and air diffuser/collector plates of the preferred embodiment have a thickness of about 0.060". This allows them to accomplish their purposes with minimal material, thus increasing volumetric and gravimetric power density. Also, having separate frames allows the thickness of the frames to be used to adjust for different electrode thicknesses and to adjust the compression of the electrode material. In the preferred embodiment, a frame thickness of about 0.073–0.075" is used to achieve this correct balance.

In a preferred embodiment of the invention, the humidification section is located immediately adjacent to and integral with the fuel cell stack.

Figure 8:
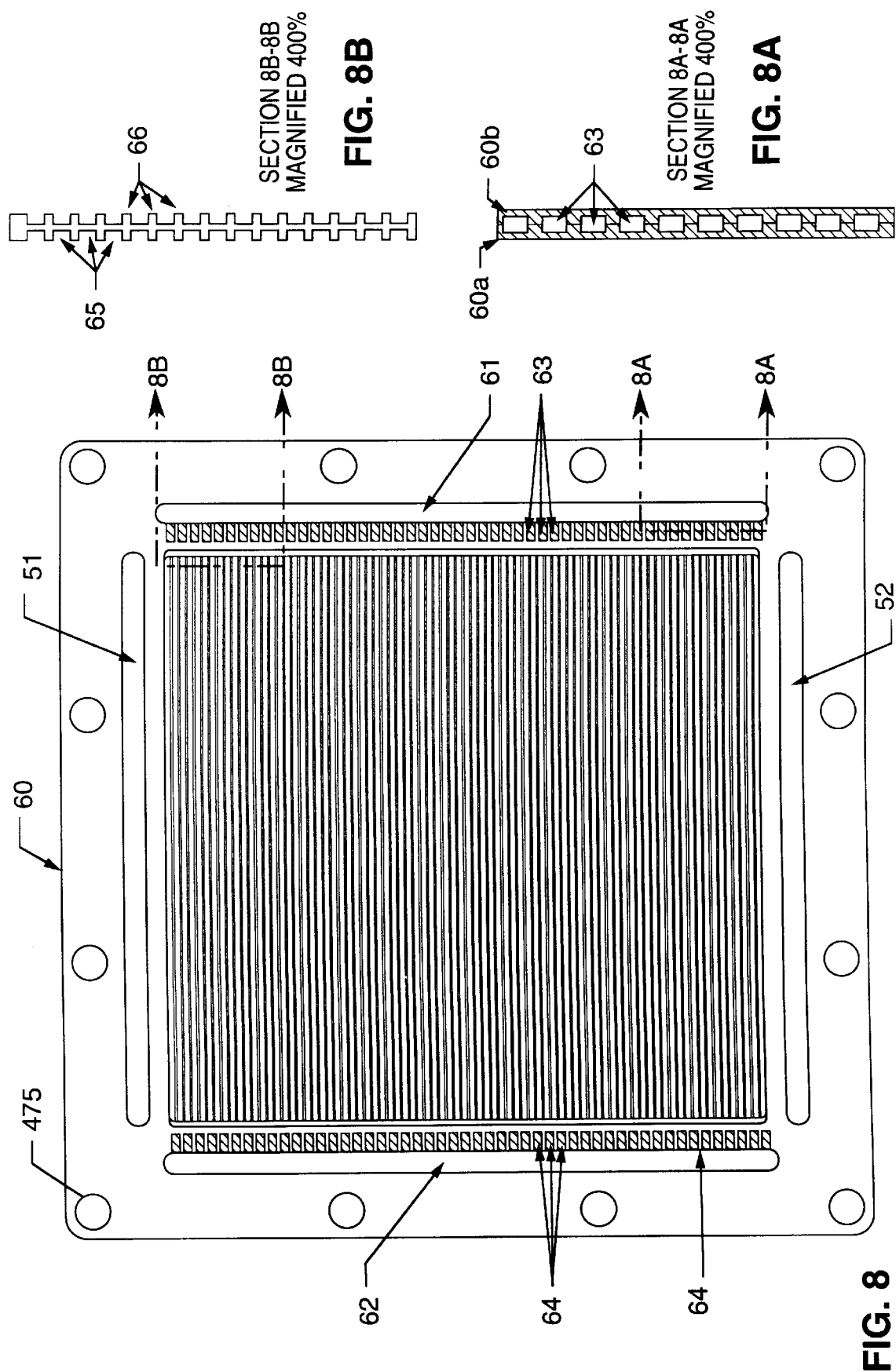
FIG. 8 shows one embodiment of an air humidification plate for use in a fuel cell stack according to the present invention.

FIG. 8 illustrates the humidification air plate 60. Oxygen containing air enters the plate from the air inlet manifold 61 through air inlet passages 63. Air moves across the plate through air flow channels 65 and between structural lands 66. Humidified air exits the plate through air outlet passages 64 and into air outlet manifold 62. Other elements of the humidification air plate include the water inlet manifold 51 and water outlet manifold 52. Tie-bolts hold the fuel cell stack assembly together through tie-bolt holes 475.

In a preferred embodiment of the invention, the humidification air plate utilizes completely parallel flow channels. The channels of the preferred embodiment have a width of about 0.0625" and a depth of about 0.040"; the lands have a width of about 0.030". The combined cross-sectional area for air flow is large so that the pressure drop is small. The channels occupy 68% of the area, allowing good contact between the flowing air and the wet humidifying membrane. The narrowness of the channels minimizes sagging of the wet membrane into the channels with consequential increase in pressure drop.

The air manifold extends across the entire width of the plate. This extended manifold provides a larger area to minimize pressure drop through the humidification section. This also aids to spread the air flow evenly across the entire plate. This is possible because the manifold normally used for hydrogen can be utilized for water since the hydrogen is not humidified in the preferred design. This frees the space normally used for the water manifold to allow the air manifold enlargement.

Figure 9:
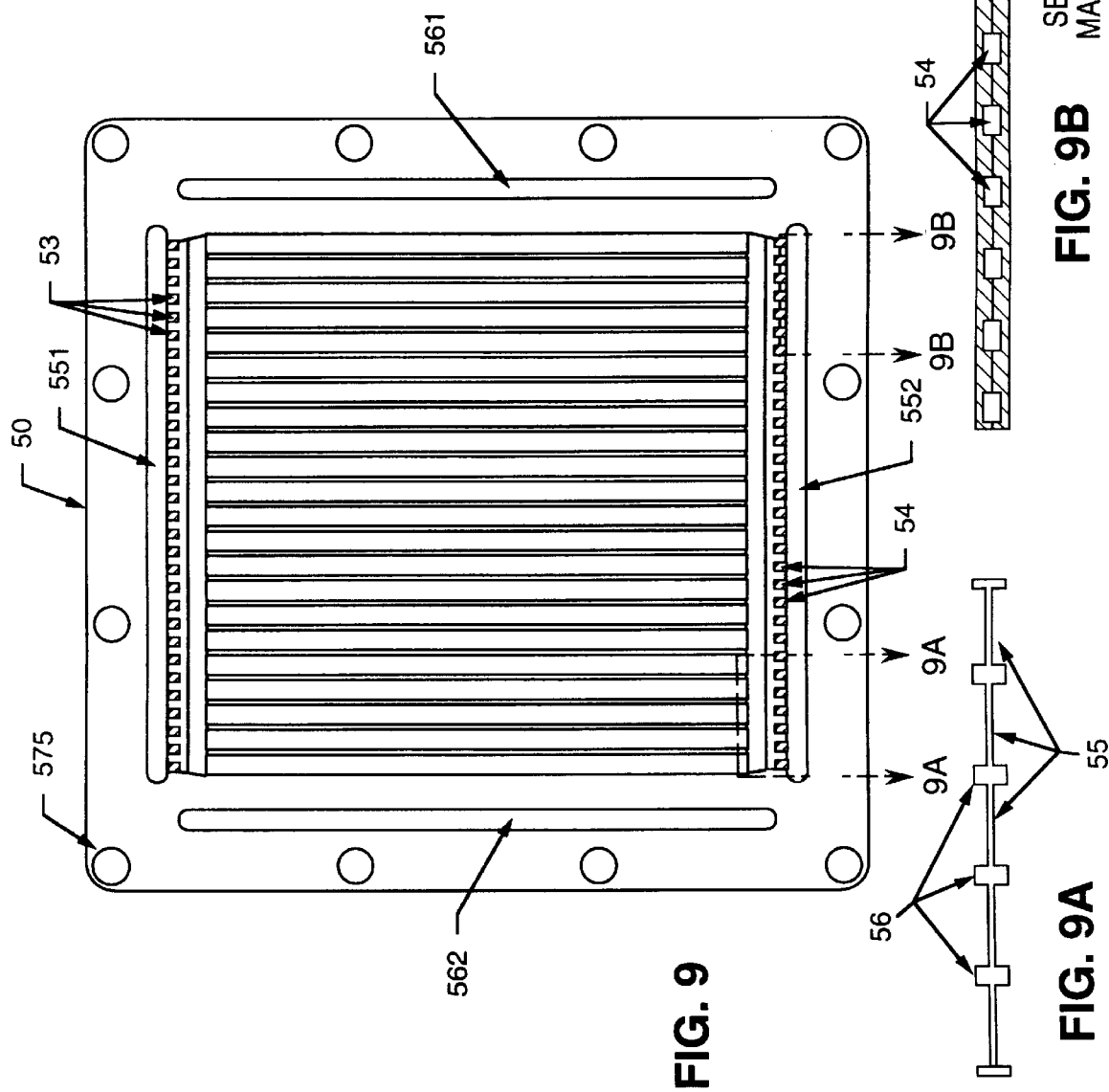
FIG. 9 shows one embodiment of a water humidification plate for use in a fuel cell stack according to the present invention.

FIG. 9 illustrates the humidification water plate 50. Cooling water enters the plate from the water inlet manifold 551 through air inlet passages 53. Water moves across the plate through water flow channels 55 and between structural lands 56. Water exits the plate through water outlet passages 54 and into water outlet manifold 552. Other elements of the humidification water plate include the air inlet manifold 561 and air outlet manifold 562. Tie-bolts hold the fuel cell stack assembly together through tie-bolt holes 575.

In the embodiment shown, the humidification water plate utilizes completely parallel flow channels. The channels of the preferred embodiment have a width of about 0.250" and a depth of about 0.040"; the lands have a width of about 0.065". The channels are wide in this plate because there is no danger of the membrane sagging into a channel filled with water. The channels occupy 79% of the area, insuring good wetting of the membrane.

The water manifold extends across the entire width of the plate. This extended manifold insures even flow across the entire plate. This manifold would normally be used for hydrogen flow in the fuel cell stack but can be used for water here because the hydrogen is not humidified in the preferred design.

In a preferred embodiment of the invention, the air and water humidification plates as shown in FIGS. 8 and 9 respectively have the following characteristics:

1) Double sided design. Air and water pass through channels on both the front and back of the plates. Sandwiched between each water and air plates is a membrane such as DuPont's Nafion® 112. The membrane serves to allow passage of gaseous water vapor (but not liquid water) from the water side to the air.
2) Plastic construction. As with the air and hydrogen frames described above, these plates are fabricated from polypropylene. This makes them inexpensive and lightweight and affords the possibility that they and the frames could be injection molded for inexpensive and facile manufacturing.

In the preferred embodiment, a combination of one water and one air plate is used for each four cells in the fuel cell stack. The air and water plates are oriented such that the flow channels are perpendicular to one another. Therefore the structural lands are perpendicular to one another, which allows for much greater support of the fairly structurally weak membrane than would be true were the channels parallel.

Figure 10:
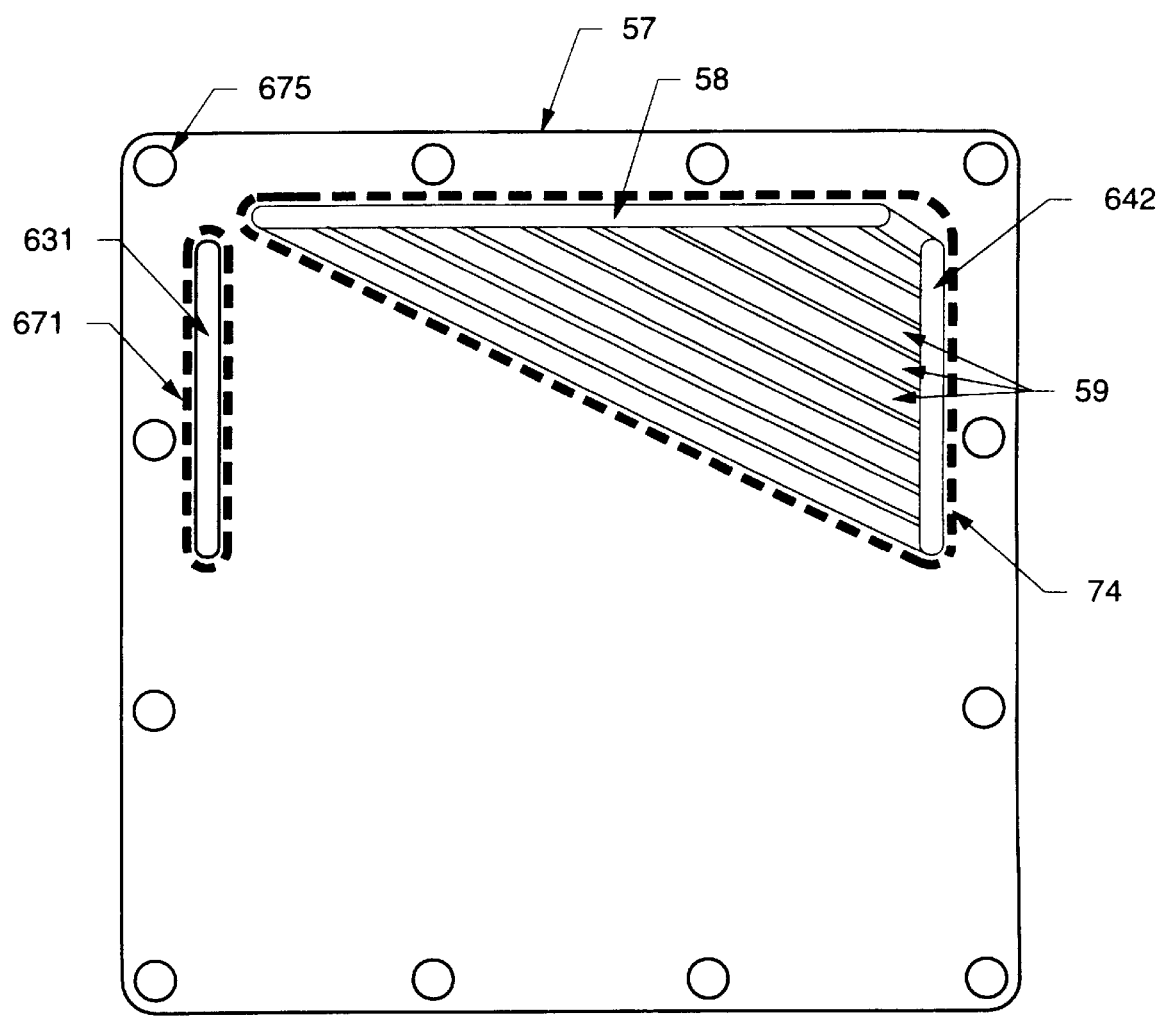
FIG. 10 shows one embodiment of a water flow transition plate for use in a fuel cell stack according to the present invention.

FIG. 10 illustrates one embodiment of the water flow transition plate 57. The cooling water manifold is located in a different position in the humidification section than in the active, power section. This diversion is accomplished by the water flow transition plate. Water enters from the coolant outlet manifold 642 and moves across the transition plate through transition flow channels 59 to the humidification coolant manifold 58.

Diverting the water provides a full width manifold for the cooling water. This allows the air manifold to be extended and enlarged in the humidification section, which reduces air pressure drop through the humidification section. This also orients the air and water plates to be perpendicular to one another as noted previously.

Other elements of the water flow transition plate include the air inlet manifold 631 and sealing O-ring 671. The water field is sealed with the transition plate O-ring 74. Tie-bolts hold the fuel cell stack assembly together through tie-bolt holes 675.

Figure 11:
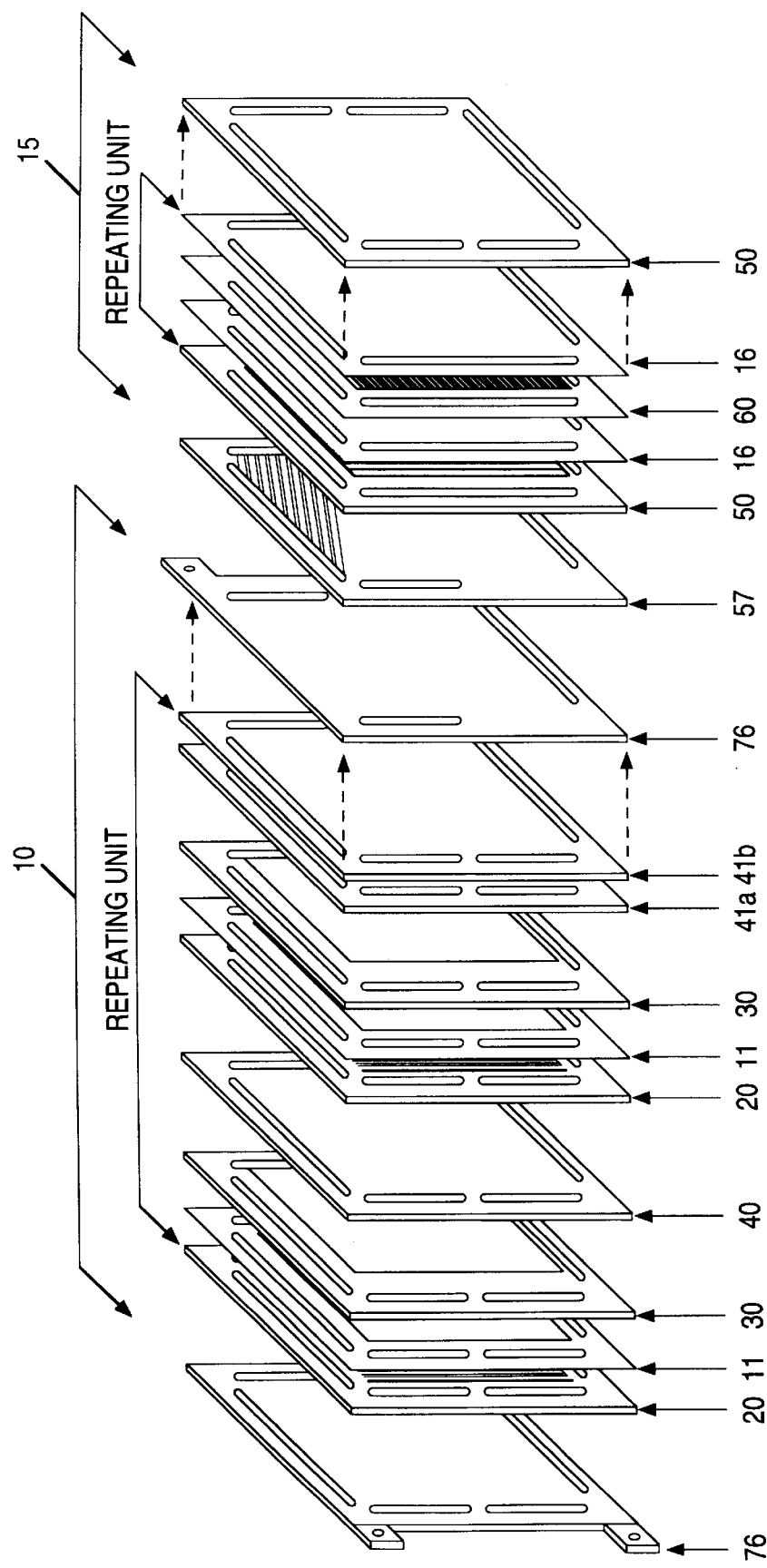
FIG. 11 shows an exploded view of one embodiment of a fuel cell stack according to the present invention.

FIG. 11 shows an exploded view of one embodiment of a fuel cell stack according to the present invention. The fuel cell active, power section 10 consists of a repeating series of fuel cells and separators. The hydrogen frame 20 with the partially assembled hydrogen diffuser/collector plate, a membrane and electrode assembly 11, and the air frame 30 with the partially assembled air diffuser/collector plate make up one cell. A separator 40 is in situated in between and in contact with two adjacent cells. The final element of a repeating unit is the cooling separator left-half 41a and cooling separator right-half 41b. A fuel cell stack comprises one or more of the repeating series of cells and separators. At each end of the fuel cell active section is an electrically conductive bus plate 76.

The fuel cell humidification section 15 consists of a series of repeating units. A repeating unit consists of a humidification water plate 50 is in contact with humidification membrane 16, which is in contact with humidification air plate 60 and, in turn, a second humidification membrane 16. A water flow transition plate 57 is located at one end of the humidification section. In the embodiment shown, a humidification water plate 50 is located at the other end of the humidification section. Structural end plates and many details have been omitted for clarity.

Under normal circumstances, a preferred embodiment of the design of the present invention is operated under the following conditions:

1) Stoichiometry: 200–300%. The value of 200% is the minimum necessary for steady, reliable performance. By keeping the stoichiometry low, the pressure required for the air supply is minimized.

Actual performance of the fuel cell stack falls off appreciably at stoichiometries below 200%. The flow of air through the channels is insufficient to remove product water, which leads to flooding of the fuel cell and the power density of the stack falls.

Testing at stoichiometries well above 300% when operating at higher power levels, however, results in inadequate humidification of the air stream. This condition will dry out the membrane at sustained operation leading to significant performance deterioration. Further, at stoichiometries above 300%, the pressure drop across the entire fuel cell stack increases. There is an increase in the parasitic load to provide the higher pressure, see FIG. 1. The marginal increase in power output is offset by the marginal increase in parasitic load.

2) Air channel velocities: 0.35 to 7.0 meters per second. The value of 0.35 is the minimum necessary for steady, reliable performance. Below 0.35, the flow of air through the channels is insufficient to remove product water. This leads to flooding of the fuel cell and power density of the stack falls.

At maximum power levels, the air channel velocities approach the maximum of 7.0 meters per second. The air flow at this level matches the maximum capability of the air delivery system.

3) Air supply pressure: less than 5 psig, preferably running at about 0.1–1.9 psig, depending on power output. Only at higher power levels does the pressure exceed 1 psig.

As mentioned in 2) above, the performance of the fuel cell stack falls off appreciably at air channel velocities below 0.35 meters per second. The air delivery system of the present invention cannot supply adequate air flow to remove product water, which leads to flooding and power density of the fuel cell stack falls. This minimum air flow results in a pressure through the stack of approximately 0.1 psig.

At higher pressures, performance of the stack increases. However, there is an increase in the parasitic load to provide the higher pressure, see FIG. 1. The marginal increase in power output is offset by the marginal increase in parasitic load.

4) Hydrogen supply pressure: preferably about 2 psig. This is easily adjusted and maintained by a gas regulator, since the hydrogen fuel is stored at significantly higher pressures, regardless of the storage medium used.

5) Temperature: 50° C. The temperature is maintained by a standard radiator and circulating water cooling system.

Actual testing on the present invention has not proved that higher temperatures result in higher net performance. The air stream is not fully saturated at higher temperatures. This condition will dry out the membrane at sustained operation leading to significant performance deterioration of the fuel cell.

What is claimed is:

1. A method of operating a PEM fuel cell having a hydrogen side electrode, an air side electrode, an electrolyte positioned between and in electrical contact with said electrodes, an air diffuser/current collector plate positioned adjacent said air side electrode, a hydrogen side diffuser/current collector plate positioned adjacent said hydrogen side electrode, wherein each of said plates includes gas diffusing channels for carrying a gas across said plates so as to expose said gas to one of said electrodes, the method comprising the steps of:

(a) introducing hydrogen gas into hydrogen gas carrying channels on said hydrogen side diffuser/current collector plate;

(b) passing said hydrogen gas through said channels to expose said hydrogen gas to said hydrogen side electrode;

(c) introducing air at a pressure of from 0.1 psig to less than 5 psig into an air inlet to air carrying channels on said air side diffuser/current collector plate, through said channels at a channel air velocity of from about 0.15 to about 7.0 meters/second, and out of said channels through an air outlet from said channels; and maintaining the pressure drop between said air inlet and said air outlet at from 0.1 to less than about 5 psi.

2. A method according to claim 1 wherein said pressure drop is less than about 3 psi.

3. A method according to claim 1 wherein said pressure drop is between about 0.1 psi and about 1.9 psi.

4. A method according to claim 1 comprising the further step of humidifying said air prior to step (c).

5. A method for operating a PEM fuel cell in a fuel cell stack, the fuel cell including a hydrogen electrode and an oxidant electrode, an oxidant gas diffuser plate adjacent said oxidant electrode and a hydrogen gas diffuser plate adjacent said hydrogen electrode, said oxidant gas diffuser plate including flow channels for permitting an oxidant gas flowing through said channels to contact said oxidant electrode, the method comprising flowing said oxidant gas through said channels with an inlet pressure of from 0.1 to less than about 5 psig and at a velocity of from about 0.15 to about 7 meters/second, and maintaining a pressure drop between an oxidant inlet, across said channels and an oxidant outlet in said stack of from 0.1 to less than 5 psi.

6. A method according to claim 5 wherein said pressure drop is less than about 3 psi.

7. A method according to claim 5 wherein said pressure drop is between about 0.1 psi and about 1.9 psi.

8. A method according to claim 5 comprising the further step of humidifying said oxidant prior to said flowing step.

9. In a method of operating a PEM fuel cell, the cell including an oxidant side electrode in facing relationship and contacting a surface for diffusing an oxidant gas over said electrode, said plate having depressions formed on the surface thereof such that a sealed oxidant gas flow channel is defined between said electrode and said surface by said depressions, the method comprising flowing an oxidant gas through said channel at an inlet pressure of from 0.1 to less than about 5 psig and at a velocity of from about 0.15 to about 7.0 meters/second, and maintaining a pressure drop between an oxidant inlet to said channel, across said channel and an oxidant outlet from said channel of from 0.1 to less than about 1.9 psi.

10. A method according to claim 9 comprising the step of changing direction of the flow of said oxidant gas between said oxidant inlet and said oxidant outlet.

11. A method of operating a PEM fuel cell having a hydrogen side electrode, an air side electrode, an electrolyte positioned between said hydrogen side electrode and said air side electrode, said electrolyte in electrical contact with said hydrogen side electrode and said air side electrode, an air diffuser/current collector plate positioned adjacent to said air side electrode, said air diffuser/collector plate defining an air carrying flow channel between said air diffuser/collector plate and said air side electrode, and a hydrogen side diffuser/current collector plate positioned adjacent to said hydrogen side electrode, said hydrogen diffuser/collector plate defining a hydrogen gas carrying channel, the method comprising the steps of:

passing hydrogen gas into said hydrogen gas carrying channel to expose said hydrogen gas to said hydrogen side electrode;

passing air into said air carrying channels at a velocity of from about 0.15 to about 7.0 meters/second and at a pressure drop of from 0.1 to less than about 1.9 psi; and reversing the direction of said air flow at least once in said air carrying channels.

12. The method according to claim 11 wherein the method further comprises the step of humidifying the air prior to passing the air into said air carrying channels.

* * * * *